(12) United States Patent
Hori

(10) Patent No.: US 10,804,568 B2
(45) Date of Patent: Oct. 13, 2020

(54) LITHIUM ION SECONDARY BATTERY AND METHOD OF PRODUCING THE SAME

(71) Applicant: TOYOTA JIDOSHA KABUSHIKI KAISHA, Toyota-shi, Aichi-ken (JP)

(72) Inventor: Yukiko Hori, Miyoshi (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 1 day.

(21) Appl. No.: 15/954,799

(22) Filed: Apr. 17, 2018

(65) Prior Publication Data

US 2018/0309159 A1 Oct. 25, 2018

(30) Foreign Application Priority Data

Apr. 24, 2017 (JP) ................. 2017-085600

(51) Int. Cl.
*H01M 4/04* (2006.01)
*H01M 4/52* (2010.01)
(Continued)

(52) U.S. Cl.
CPC ....... *H01M 10/058* (2013.01); *H01M 4/0404* (2013.01); *H01M 4/0447* (2013.01); *H01M 4/131* (2013.01); *H01M 4/1391* (2013.01); *H01M 4/364* (2013.01); *H01M 4/505* (2013.01); *H01M 4/525* (2013.01); *H01M 4/628* (2013.01); *H01M 10/049* (2013.01); *H01M 10/0525* (2013.01); *H01M 10/0568* (2013.01);
(Continued)

(58) Field of Classification Search
CPC .. H01M 10/58; H01M 4/0404; H01M 4/0447; H01M 4/1391; H01M 4/505; H01M 4/525; H01M 10/058
See application file for complete search history.

(56) References Cited

U.S. PATENT DOCUMENTS

| | | | |
|---|---|---|---|
| 8,313,721 B2 | 11/2012 | Thackeray et al. | |
| 2012/0141869 A1* | 6/2012 | Takahata ............ | H01M 10/052 429/188 |
| 2015/0050541 A1* | 2/2015 | Kinoshita ........... | H01M 2/1646 429/144 |
| 2015/0372304 A1 | 12/2015 | Hasegawa et al. | |

FOREIGN PATENT DOCUMENTS

| | | |
|---|---|---|
| CN | 105103343 A | 11/2015 |
| EP | 2555293 A1 | 2/2013 |

(Continued)

OTHER PUBLICATIONS

Zhian Zhang et al., "A comparative study of different binders and their effects on electrochemical properties of $LiMn_2O_4$ cathode in lithium ion batteries", Journal of Power Sources, vol. 247, 2014, pp. 1-8.

(Continued)

*Primary Examiner* — Ula C Ruddock
*Assistant Examiner* — Frank A Chernow
(74) *Attorney, Agent, or Firm* — Sughrue Mion, PLLC (57) ABSTRACT

There is provided a method of producing a lithium ion secondary battery. A positive electrode mixture layer is formed on a positive electrode current collector using an aqueous positive electrode mixture paste that includes a positive electrode active material including a lithium manganese composite oxide, and aqueous solvent, and additionally includes $Li_5FeO_4$ as an additive.

5 Claims, 3 Drawing Sheets

(51) Int. Cl.
*H01M 4/50* (2010.01)
*H01M 10/05* (2010.01)
*H01M 10/058* (2010.01)
*H01M 10/0525* (2010.01)
*H01M 10/0568* (2010.01)
*H01M 4/525* (2010.01)
*H01M 4/505* (2010.01)
*H01M 4/62* (2006.01)
*H01M 4/36* (2006.01)
*H01M 10/04* (2006.01)
*H01M 4/1391* (2010.01)
*H01M 4/131* (2010.01)
*H01M 4/02* (2006.01)

(52) U.S. Cl.
CPC .. *H01M 2004/028* (2013.01); *H01M 2220/20* (2013.01); *H01M 2300/0037* (2013.01)

(56) References Cited

FOREIGN PATENT DOCUMENTS

| | | |
|---|---|---|
| JP | 2007287446 A | 11/2007 |
| JP | 2013054871 A | 3/2013 |
| JP | 2014-067629 A | 4/2014 |
| JP | 2014-157653 A | 8/2014 |
| JP | 2015-088268 A | 5/2015 |
| JP | 2016-122550 A | 7/2016 |
| JP | 2016-162719 A | 9/2016 |
| KR | 10-2016-0065965 A | 6/2016 |
| WO | 2014142045 A1 | 9/2014 |
| WO | 2015/011884 A1 | 1/2015 |
| WO | 2015/068017 A1 | 5/2015 |

OTHER PUBLICATIONS

Communication dated Jan. 24, 2020 from the Canadian Intellectual Property Office in application No. 3,002,209.

* cited by examiner

LITHIUM ION SECONDARY BATTERY AND METHOD OF PRODUCING THE SAME

INCORPORATION BY REFERENCE

The disclosure of Japanese Patent Application No. 2017-085600 filed on Apr. 24, 2017 including the specification, drawings and abstract is incorporated herein by reference in its entirety.

BACKGROUND

1. Technical Field

The present disclosure relates to a lithium ion secondary battery and a method of producing the same, and specifically, to a positive electrode mixture paste including an aqueous solvent, a method of producing a lithium ion secondary battery using the same, and a lithium ion secondary battery that can be produced using the production method.

2. Description of Related Art

Since lithium ion secondary batteries are lightweight and can obtain a high energy density, they are preferable for use in high output power supplies for driving a vehicle such as an electric vehicle and a hybrid vehicle. In recent years, positive electrode active materials having a higher potential than in the related art have been developed and the demand for lithium ion secondary batteries as a power supply for driving vehicles is expected to increase gradually. Examples of this type of positive electrode active material include a spinel structure positive electrode active material containing the element manganese. For example, a spinel structure lithium nickel manganese composite oxide ($LiNi_xMn_{2-x}O_4$) in which some manganese of a spinel structure lithium and manganese composite oxide ($LiMn_2O_4$) is substituted with nickel, for example, $LiNi_{0.5}Mn_{1.5}O_4$ is known as a favorable high potential type positive electrode active material in which an upper limit potential of a positive electrode operation potential is 4.5 V or more based on metallic lithium.

Incidentally, as a composition (hereinafter referred to as a "positive electrode mixture paste") prepared as a paste or slurry in order to form a positive electrode mixture layer (also referred to as a positive electrode active material layer) on a positive electrode current collector using the above positive electrode active material, a nonaqueous positive electrode mixture paste prepared using a nonaqueous solvent (that is, an organic solvent) has generally been used in the related art. However, in order to reduce the time and effort and costs incurred for treating a nonaqueous solvent, reduce the environmental burden, and the like, an aqueous positive electrode mixture paste prepared using an aqueous solvent (that is, a solvent mainly containing $H_2O$, typically, water) is preferably used.

SUMMARY

However, when an aqueous positive electrode mixture paste is used, unlike a nonaqueous positive electrode mixture paste, problems due to the presence of an aqueous solvent may occur. For example, when a positive electrode active material including a lithium manganese composite oxide containing at least lithium and manganese as metal elements is used, if water comes in contact with positive electrode active material particles made of the lithium manganese composite oxide, an exchange reaction occurs between hydrogen ions in water and lithium ions in the positive electrode active material, a pH of the paste (slurry) increases, and a large amount of hydrogen ions can adhere to the surface of the active material particles. Thus, when exposed to a high temperature in that state, for example, when a positive electrode mixture layer formed by applying the positive electrode mixture paste to a positive electrode current collector is dried at a high temperature, or when an aging treatment at a high temperature is performed after a battery is assembled, oxygen is also desorbed together with hydrogen ions on the surface of the active material and the active material may be brought into an oxygen deficient state. Then, the valence of Mn contained in the active material may be reduced from 4+ to 3+ due to charge compensation. Such a reduction in valence is not preferable because it causes an increase in internal resistance of the battery. In particular, when a thick $Mn^{3+}$ layer (for example, a thick $Mn^{3+}$ layer whose maximum thickness reaches 100 nm) is formed on the surface of the positive electrode active material particles that can be brought into contact with a nonaqueous electrolytic solution, since the internal resistance may increase, this is not preferable.

Regarding the above, for example, in Japanese Unexamined Patent Application Publication No. 2016-122550 (JP 2016-122550 A), a technology in which, when a paste for preparing an aqueous positive electrode is prepared, a dispersant including at least one of a phosphoric acid monoester and a phosphoric acid diester is mixed into, the peripheries of the positive electrode active material particles made of a lithium manganese composite oxide are surrounded by phosphoric acid ester molecules, and thus desorption of oxygen and outflow of Mn from the positive electrode active material are prevented is disclosed. In the technology described in JP 2016-122550 A, certain results can be obtained as a technology for preventing oxygen from being desorbed from a positive electrode active material. However, this is not a technology in which oxygen (typically, in an ionic form such as an oxide ion and a peroxide ion) is supplied to the positive electrode active material from the surroundings and the valence of Mn positively increases from 3+ to 4+.

Thus, in the present disclosure, even though a positive electrode mixture layer containing a positive electrode active material including a lithium manganese composite oxide is formed on a positive electrode current collector using an aqueous positive electrode mixture paste, it is possible to effectively supply oxygen and increase the valence of Mn (restore from 3+ to 4+).

The present disclosure provides an aqueous positive electrode mixture paste used for forming a positive electrode mixture layer of a lithium ion secondary battery. The aqueous positive electrode mixture paste disclosed here includes a positive electrode active material including a lithium manganese composite oxide and an aqueous solvent, and additionally includes $Li_5FeO_4$ as an additive. As a first aspect of the present disclosure, there is provided a method of producing a lithium ion secondary battery. That is, the method of producing a lithium ion secondary battery disclosed here is a method of producing a lithium ion secondary battery that includes a positive electrode including a positive electrode mixture layer on a positive electrode current collector, a negative electrode including a negative electrode mixture layer on a negative electrode current collector, and a nonaqueous electrolytic solution containing a lithium salt. The negative electrode mixture layer includes a negative electrode active material. The method includes preparing an aqueous positive electrode mixture paste that includes a positive electrode active material including a lithium manganese composite oxide, an aqueous solvent, and additionally includes $Li_5FeO_4$ as an additive; preparing a positive electrode by forming a positive electrode mixture layer on a positive electrode current collector using the aqueous positive electrode mixture paste; preparing an electrode body using the positive electrode and a negative electrode, constructing a battery assembly by accommodating the electrode body and a nonaqueous electrolytic solution in a battery case; and performing an initial charging process on the battery assembly.

In addition, as a second aspect, there is provided a lithium ion secondary battery assembly. The lithium ion secondary battery assembly includes an electrode body that includes a positive electrode including a positive electrode mixture layer on a positive electrode current collector and a negative electrode including a negative electrode mixture layer on a negative electrode current collector, and a nonaqueous electrolytic solution including a lithium salt, wherein the positive electrode mixture layer includes a lithium manganese composite oxide as a positive electrode active material and includes $Li_5FeO_4$ as an additive. The negative electrode mixture layer includes a negative electrode active material The term "lithium ion secondary battery assembly" here refers to a structure (that is, an assembly) in which members and materials constituting a lithium ion secondary battery in a step before an initial charging process is performed are assembled in a form of a battery body. When the initial charging process (also referred to as a conditioning treatment) is performed on the lithium ion secondary battery assembly, it can be used as a lithium ion secondary battery.

In the method of producing a lithium ion secondary battery and the lithium ion secondary battery assembly disclosed here, the aqueous positive electrode mixture paste having the above composition is used to form the positive electrode mixture layer. The inventors found that, when $Li_5FeO_4$ is mixed into the positive electrode mixture layer together with the positive electrode active material including a lithium manganese composite oxide (hereinafter simply referred to as a "manganese-containing positive electrode active material"), during the initial charging process, $Li_5FeO_4$ reacts in the positive electrode mixture layer as shown in the following formula: $2Li_5FeO_4=5Li_2O+Fe_2O_3$, and further, oxygen is generated during high temperature aging performed after the initial charging from $Li_2O$ which is a reaction product substance and is supplied to the manganese-containing positive electrode active material. Therefore, in the lithium ion secondary battery (and the lithium ion secondary battery assembly) produced using the method of producing a lithium ion secondary battery disclosed here, in the step of the initial charging process (conditioning treatment), oxygen (typically, in an ionic form such as an oxide ion) derived from $Li_5FeO_4$ is supplied to the manganese-containing positive electrode active material, an amount of $Mn^{3+}$ can be reduced and regeneration of $Mn^{4+}$ can be promoted. Thus, it is possible to prevent the internal resistance (reaction resistance) of the battery from increasing due to generation and accumulation of $Mn^{3+}$, prevent the battery performance from deteriorating, and, for example, prevent charging and discharging characteristics from deteriorating. Here, in Japanese Unexamined Patent Application Publication No. 2015-88268 (JP 2015-88268 A), Japanese Unexamined Patent Application Publication No. 2014-157653 (JP 2014-157653 A), and Japanese Unexamined Patent Application Publication No. 2014-67629 (JP 2014-67629 A), lithium ion secondary batteries containing $Li_5FeO_4$ are described. However, in the present disclosure, usage purposes, applications, and combinations with the active material of $Li_5FeO_4$ are different, and there is no common point in the technical idea.

In addition, preferably, in the method of producing a lithium ion secondary battery according to the first aspect and the lithium ion secondary battery assembly according to the second aspect, with respect to the total solid content of 100 wt % in the positive electrode mixture paste or the total solid content of 100 wt % constituting the positive electrode mixture layer, an amount of $Li_5FeO_4$ added may be within a range of 0.3 wt % to 2.0 wt %. In the positive electrode mixture layer containing $Li_5FeO_4$ at such a proportion with respect to the total solid content constituting the positive electrode mixture layer, during the initial charging process, an appropriate amount of oxygen (typically, in an ionic form) can be supplied to the manganese-containing positive electrode active material. In addition, since a content of $Li_5FeO_4$ is not excessive, it is possible to prevent corrosion of the positive electrode current collector due to an increase in pH due to the presence of an excess amount of decomposition products of $Li_5FeO_4$ and it is possible to improve the durability of the battery.

In the method of producing a lithium ion secondary battery according to the first aspect and the lithium ion secondary battery assembly according to the second aspect, $LiNi_{0.5}Mn_{1.5}O_4$ may be included as the manganese-containing positive electrode active material. When such a 5 V-class manganese-containing positive electrode active material is used together with an additive: $Li_5FeO_4$, it is possible to provide a high voltage and high capacity lithium ion secondary battery.

In the first aspect, at least one of $LiNi_{0.5}Mn_{1.5}O_4$, $LiMn_2O_4$, $LiNi_xMn_{2-x}O_4$, $LiNi_xMe_yMn_{2-x-y}O_4$, $Li_2MnO_3$, and $LiMnPO_4$ may be included as the positive electrode active material. x in $LiNi_xMn_{2-x}O_4$ may satisfy $0<x<2$, and Me in $LiNi_xMe_yMn_{2-x-y}O_4$ may be at least one element selected from the group including Fe, Ti, Al, Si, Mg, Ca, Ba, Sr, Sc, V, Cr, Co, Cu, Zn, Ga, Y, Ru, Rh, Pd, In, Sn, Sb, La, Ce, Sm, Zr, Nb, Ta, Mo, and W. x and y in $LiNi_xMe_yMn_{2-x-y}O_4$ may satisfy $0<(x+y)<2$.

The first aspect may further include performing an aging treatment in which the battery assembly is left at a temperature of 35° C. or higher for duration greater than or equal to 6 hours and less than or equal to 50 hours after the battery assembly is initially charged.

In addition, as a third aspect, there is provided a lithium ion secondary battery that includes an electrode body including a positive electrode including a positive electrode mixture layer on a positive electrode current collector and a negative electrode including a negative electrode mixture layer on a negative electrode current collector, and a nonaqueous electrolytic solution containing a lithium salt. Then, in the lithium ion secondary battery disclosed here, the positive electrode mixture layer includes a lithium manganese composite oxide as a positive electrode active material. The negative electrode mixture layer includes a negative electrode active material. In an EELS spectrum obtained by performing line analysis from the surface into the positive electrode active material particles using an STEM-EELS method in a cross section (that is, a CP processed cross section obtained by Ar ion milling) of the positive electrode mixture layer in a step after an initial charging process, an average value of O peak ratios (A/B) between an O peak height (A) at a manganese (Mn) maximum peak position on the surface of the particles and an O peak height (B) at an O maximum peak position in the EELS spectrum of the line analysis is 0.8 or more.

The "O peak ratio (A/B) based on the STEM-EELS method" defined as above may be an index of an oxygen supply status in the positive electrode mixture layer of the lithium ion secondary battery in the step after the initial charging process. Thus, in the lithium ion secondary battery disclosed here, the average value of O peak ratios is 0.8 or more, and more preferably 0.9 or more. This indicates that a sufficient amount of oxygen (in an ionic form) has been supplied to the manganese-containing positive electrode active material contained in the positive electrode mixture layer after the initial charging process, for example, $LiNi_{0.5}Mn_{1.5}O_4$. Thus, in the lithium ion secondary battery disclosed here, for example, $Mn^{3+}$ can be easily returned to $Mn^{4+}$ after the initial charging process. Therefore, according to the lithium ion secondary battery disclosed here, it is possible to prevent the internal resistance (reaction resistance) of the battery from increasing due to generation and accumulation of $Mn^{3+}$, prevent the battery performance from deteriorating, and, for example, prevent charging and discharging characteristics from deteriorating.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Exemplary embodiments of an aqueous positive electrode mixture paste disclosed here, a method of producing a lithium ion secondary battery performed using the aqueous positive electrode mixture paste, and a lithium ion secondary battery (and a battery assembly before an initial charging process) obtained by the production method will be described below in detail with reference to the drawings. Components other than those particularly mentioned in this specification that are necessary for implementation can be recognized by those skilled in the art as design matters based on the related art in the field. The present disclosure can be implemented based on content disclosed in this specification and common general technical knowledge in the field. Here, in this specification, when a numerical range is described as A to B (here, A and B are arbitrary numbers), this is the same as a general interpretation indicating A or more and B or less.

In this specification, the term "lithium ion secondary battery" refers to a secondary battery in which lithium ions in a nonaqueous electrolytic solution are responsible for charge transfer. In addition, the term "electrode body" refers to a structure that forms a main body of a battery including a positive electrode, a negative electrode, and a porous insulating layer that can function as a separator between the positive and negative electrodes. The term "positive electrode active material" or "negative electrode active material" refers to a compound that can reversibly occlude and release a chemical species (lithium ions in a lithium ion secondary battery) serving as a charge carrier.

Figure 1:
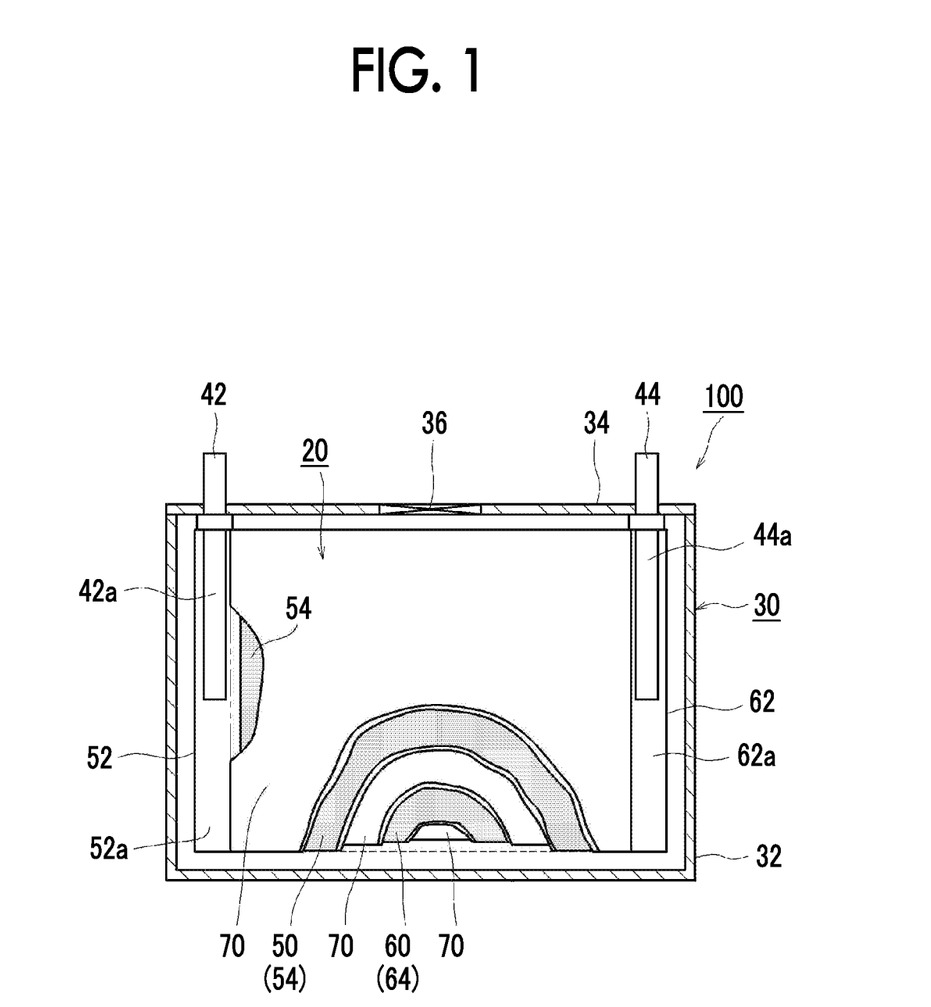
FIG. 1 is longitudinal sectional diagram schematically showing a configuration of a lithium ion secondary battery according to an embodiment.

As shown in FIG. 1, a lithium ion secondary battery 100 according to the present embodiment is a battery in which an electrode body 20 (typically, a flat electrode body 20) and a nonaqueous electrolytic solution (not shown) are accommodated in a battery case (that is, an outer container) 30. The battery case 30 includes a box-shaped (that is, a parallelepiped shape with a bottom) case main body 32 having an opening at one end and a lid 34 for sealing the opening of the case main body 32. That is, the one end corresponds to the upper end when the battery is generally disposed or used. As a material of the battery case 30, a lightweight metallic material with favorable thermal conductivity, for example, aluminum, stainless steel, or nickel-plated steel, may be preferably used. In addition, a positive electrode terminal 42 and a negative electrode terminal 44 for external connection are provided in the lid 34. In addition, in the lid 34, a gas discharge valve 36 that is set to release an internal pressure when the internal pressure of the battery case 30 rises to a predetermined level or more, and an inlet (not shown) through which a nonaqueous electrolytic solution is injected into the battery case 30 are provided. Here, in the battery case 30, the lid 34 is welded to the periphery of the opening of the battery case main body 32, and thus a boundary between the battery case main body 32 and the lid 34 can be bonded (sealed).

Figure 2:
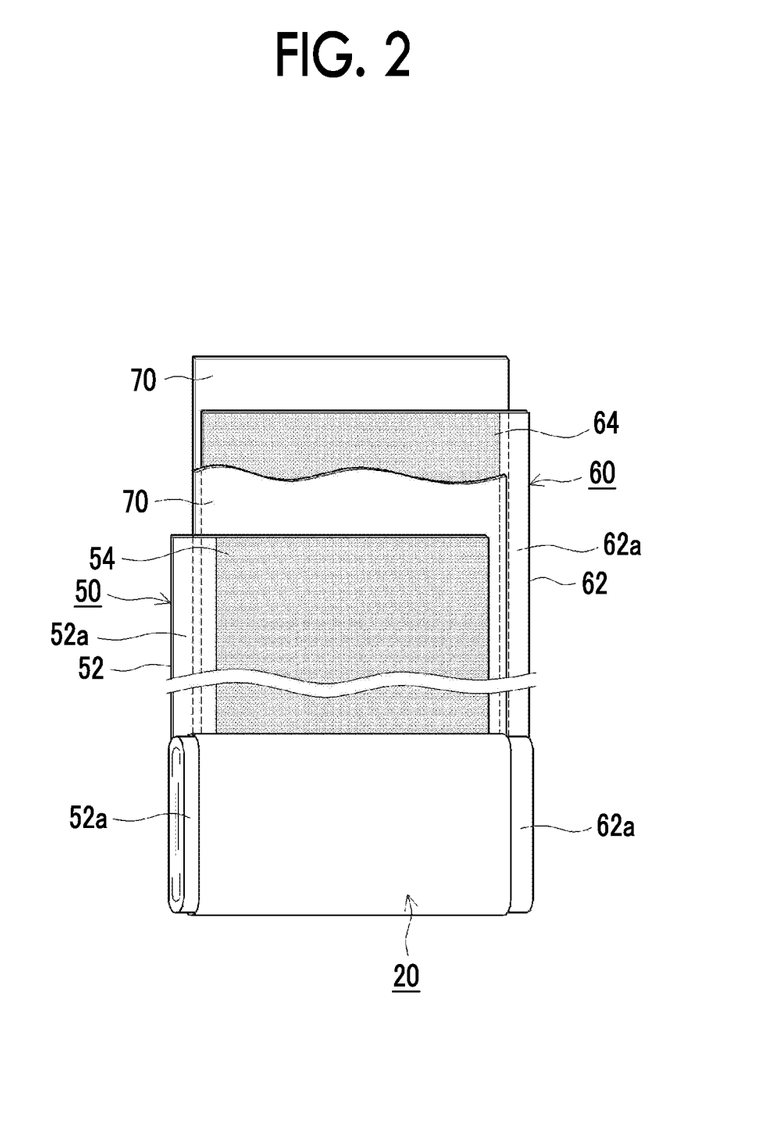
FIG. 2 is a schematic diagram showing a configuration of an electrode body included in the lithium ion secondary battery according to the embodiment.

As shown in FIG. 2, the electrode body 20 according to the present embodiment is a wound electrode body 20 in which an elongated positive electrode 50, an elongated negative electrode 60, and an elongated separator 70 are laminated and wound in a longitudinal direction. In the present embodiment, the wound electrode body 20 of which a winding axis has a sideways orientation is accommodated in the battery case 30 in a state in which the winding axis has a sideways orientation, that is, the lid 34 is disposed in one direction perpendicular to the winding axis of the wound electrode body 20 therefrom (above the battery case 30). Specifically, the wound electrode body 20 according to the present embodiment is an electrode body that is formed by superimposing the positive electrode (positive electrode sheet) 50 in which a positive electrode mixture layer 54 is formed on one surface or both surfaces (here, both surfaces) of an elongated positive electrode current collector 52 made of an aluminum foil or the like in the longitudinal direction and the negative electrode (negative electrode sheet) 60 in which a negative electrode mixture layer 64 is formed on one surface or both surfaces (here, both surfaces) of an elongated negative electrode current collector 62 made of a copper foil or like in the longitudinal direction with the elongated separator (separator sheet) 70 therebetween and winding them in a flat shape in the longitudinal direction. At the central part of the wound electrode body 20 in the winding axis direction, a wound core part in which the positive electrode mixture layer 54, the negative electrode mixture layer 64, and the separator 70 are densely laminated is formed. In addition, a positive electrode current collector plate and a negative electrode current collector plate which are not shown are bonded to a positive electrode active material not formed part 52a and a negative electrode mixture layer not formed part 62a which protrude from both ends of the wound electrode body 20 in the winding axis direction to form a current collecting structure of the battery. However, since such a structure is similar to that of a rectangular lithium ion secondary battery including a wound electrode body of the related art, details thereof will not be described. Here, when the present disclosure is implemented, the type of the electrode body is not necessarily limited to the shown winding type. For example, a lithium ion secondary battery including a laminate type electrode body formed by laminating a plurality of positive electrode sheets and negative electrode sheets with separators therebetween may be used. In addition, as can be clearly understood from technology information disclosed in this specification, the shape of the battery is not limited to the above rectangular shape.

Figure 3:
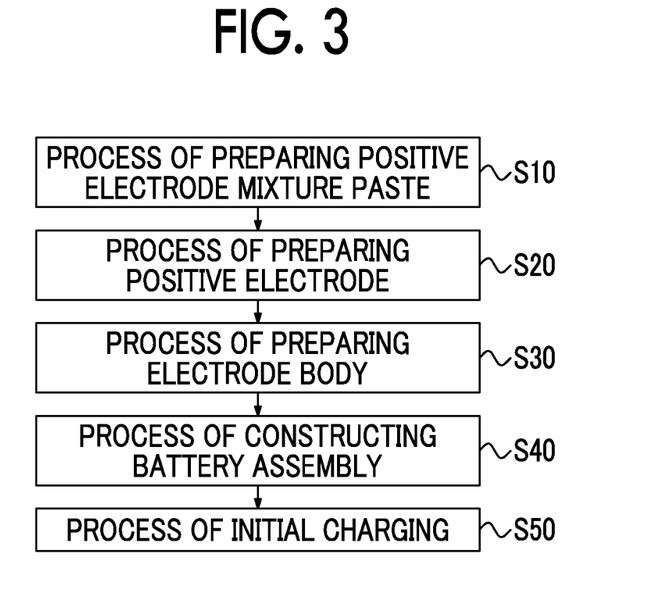
FIG. 3 is a general flowchart for describing processes of producing a lithium ion secondary battery according to an embodiment.

As shown in FIG. 3, production processes according to the present embodiment include a positive electrode mixture paste preparing process (S10) in which an aqueous positive electrode mixture paste with a composition to be described below is prepared, a positive electrode preparing process (S20) in which the prepared positive electrode mixture paste is applied to a positive electrode current collector to prepare a positive electrode, an electrode body preparing process (S30) in which an electrode body is prepared using the prepared positive electrode and a separately prepared negative electrode, a battery assembly constructing process (S40) in which the prepared electrode body and a nonaqueous electrolytic solution are accommodated in a predetermined battery case to construct a battery assembly, and an initial charging process (S50) in which the constructed battery assembly is initially charged to obtain a workable lithium ion secondary battery. The processes will be described below in detail.

First, the positive electrode mixture paste preparing process (S10) will be described. The aqueous positive electrode mixture paste used is prepared to include a manganese-containing positive electrode active material and an aqueous solvent, and additionally include $Li_5FeO_4$ as an additive. As the manganese-containing positive electrode active material used, various manganese-containing positive electrode active materials used in lithium ion secondary batteries of the related art may be used. Preferably, various high potential type lithium manganese composite oxides whose upper limit potential of a positive electrode operation potential is 4.3 V or more based on metallic lithium can be used. A high potential type lithium manganese composite oxide whose upper limit potential of a positive electrode operation potential is 4.5 V or more, and particularly, close to 5.0 V based on metallic lithium, which is generally called a 5 V-class oxide, can be suitably used. For example, a spinel structure lithium and manganese composite oxide ($LiMn_2O_4$), a spinel structure lithium manganese nickel composite oxide in which some manganese is substituted with nickel ($LiNi_xMn_{2-x}O_4$, here $0<x<2$, preferably, $0<x<1$), and lithium-, manganese- and nickel-containing composite oxides containing other metal elements ($LiNi_xMe_yMn_{2-x-y}O_4$, here Me is one, two or more elements selected from the group including Fe, Ti, Al, Si, Mg, Ca, Ba, Sr, Sc, V, Cr, Co, Cu, Zn, Ga, Y, Ru, Rh, Pd, In, Sn, Sb, La, Ce, Sm, Zr, Nb, Ta, Mo, and W (more preferably, at least one transition metal element such as Co, Ti, Fe, or W), $0<(x+y)<2$, more preferably, $0<(x+y)<1$), and the like may be exemplified. Alternatively, a layered structure or olivine structure lithium manganese composite oxide (for example, $Li_2MnO_3$ and $LiMnPO_4$) may be used. Among them, a high potential spinel structure lithium manganese composite oxide (for example $LiNi_{0.5}Mn_{1.5}O_4$) whose upper limit potential of a positive electrode operation potential is 4.5 V or more based on metallic lithium is particularly preferably used.

The positive electrode mixture paste disclosed here is an aqueous positive electrode mixture paste prepared using an aqueous solvent. Examples of the aqueous solvent include tap water, deionized water, and distilled water. Deionized water or distilled water is preferably used because almost no impurities are contained therein. In addition, the aqueous positive electrode mixture paste disclosed here includes $Li_5FeO_4$ as an additive. Although not particularly limited, with respect to the total solid content (100 wt %) in the prepared positive electrode mixture paste, an amount of $Li_5FeO_4$ added is preferably 0.3 wt % or more and 2.0 wt % or less, and more preferably 0.6 wt % or more and 1.5 wt % or less. For example, typically, about 0.3 g to 2 g of $Li_5FeO_4$ in a powder form is added to 100 g of a solid paste containing no $Li_5FeO_4$. With such a content (compositional proportion), an appropriate amount of oxygen (typically, in an ionic form) is supplied to the manganese-containing positive electrode active material during initial charging, an increase in the amount of $Mn^{3+}$ can be prevented and $Mn^{4+}$ being present stably can be promoted. In addition, since a content of $Li_5FeO_4$ is not excessive, it is possible to prevent corrosion of the positive electrode current collector due to an increase in pH according to the presence of decomposition products of $Li_5FeO_4$, and durability is able to be suitably maintained.

In addition, the aqueous positive electrode mixture paste disclosed here can include various materials included in this type of paste material in the related art without particular limitation as components in addition to the above positive electrode active material, composite powder, and aqueous solvent. For example, in order to improve conductivity in the positive electrode mixture layer, a conductive additive such as carbon black (for example, acetylene black), graphite particles, or carbon nanotubes is preferably added at a proportion of 10 wt % or less (for example, 3 wt % to 10 wt %) when the total solid content in the paste is set as 100 wt %. In addition, as a binding agent (binder), a water-soluble or water-dispersible polymer such as a fluororesin (such as polytetrafluoroethylene (PTFE)), rubbers (such as styrene butadiene copolymer (SBR)), polyvinyl alcohol (PVA), a vinyl acetate copolymer, polyacrylic acid (PAA), or an acrylate polymer is preferably added at a proportion of 5 wt % or less (for example, 1 wt % to 5 wt %) when the total solid content in the paste is set as 100 wt %. In addition, as a thickener, a cellulose-based polymer such as carboxymethyl cellulose (CMC) or hydroxypropylmethylcellulose (HPMC) is preferably added at a proportion of 3 wt % or less (for example, 0.5 wt % to 3 wt %) when the total solid content in the paste is set as 100 wt %. In addition, as an acid consumption agent, an appropriate amount (for example, 0.1 wt % to 3 wt %) of lithium phosphate, lithium pyrophosphate, or the like may be added.

Figure 4:
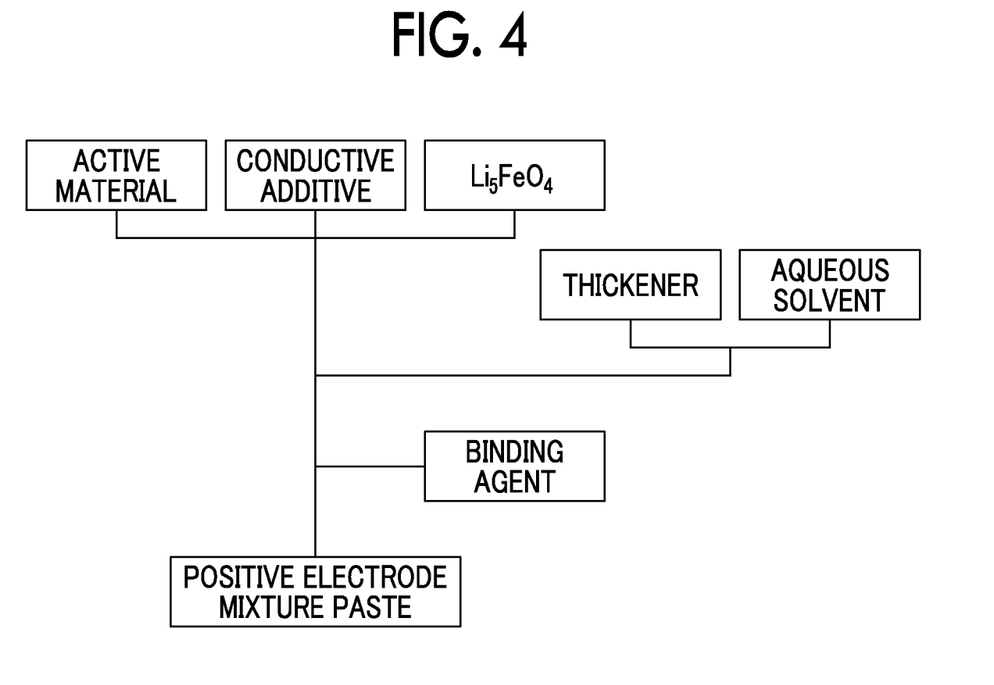
FIG. 4 is a general flowchart for describing processes of producing an aqueous positive electrode mixture paste according to an embodiment.

Although not particularly limited, for example, as in the flowchart shown in FIG. 4, first, the above various components, the active material particles, the conductive additive, and $Li_5FeO_4$ (particle form) are mixed using a roll mill or another appropriate disperser to prepare a mixed powder material. Next, an aqueous solvent (typically, water such as deionized water) in which a thickener is dispersed (or dissolved) in advance is added to the mixed powder material prepared in an appropriate disperser and dispersed thoroughly. Then, when the binding agent (binder) is added and mixed in thoroughly, it is possible to prepare a desired aqueous positive electrode mixture paste. A suitable solid content proportion is 70 wt % or more (for example, 70 wt % to 85 wt %). A pH is adjusted using phosphoric acid or the like, and a pH of the paste is preferably adjusted to be within a neutral range (for example, about 7 to 11).

Next, the positive electrode preparing process (S20) will be described. In this process, as the prepared (produced) positive electrode mixture paste, the aqueous positive electrode mixture paste is applied (coated) to a surface (one surface or both surfaces) of the positive electrode current collector using an appropriate coating device such as a gravure coater, a slit coater, a die coater, a comma coater, or a dip coater. Then, water is removed from the coated product by performing a drying treatment such as air drying, heating, or decompressing on the positive electrode current collector to which the aqueous positive electrode mixture paste is applied, and a positive electrode sheet in which the positive electrode mixture layer is formed on the positive electrode current collector is prepared. The drying treatment is not particularly limited, and can be performed by a general method in the related art (for example, heat drying or decompressing drying). For example, in consideration of production efficiency, heat drying can be suitably used. In consideration of efficiently drying in a short time, hot air drying in which hot air with a predetermined temperature is sent to the positive electrode mixture layer (coated product) for drying is suitable. A drying temperature is set to a temperature at which constituent components (typically, the positive electrode active material, the conductive additive, the binder, and the like) constituting the positive electrode mixture layer are not altered. For example, the drying temperature can be set to 120° C. to 200° C. A drying time may be appropriately set according to conditions such as the drying temperature and an air capacity for hot air drying. In general, a drying time of 10 seconds to 300 seconds (typically, 20 seconds to 200 seconds, for example, 30 seconds to 100 seconds) can be used. The positive electrode preparing process (S20) may further include a process of pressing the positive electrode mixture layer. When appropriate press processing is performed as necessary, it is possible to adjust properties (for example, an average thickness, an active material density, and a porosity) of the positive electrode mixture layer.

Here, independently of the positive electrode preparing process (S20), an opposing negative electrode is prepared. However, the preparing process itself on the side of the negative electrode is the same as in preparation of the negative electrode in lithium ion secondary batteries of the related art. Since this process does not characterize the present disclosure, details thereof will not be described. Only the outline is described as follows. As the negative electrode active material constituting the negative electrode mixture layer, one, two or more of various materials that can be used as a negative electrode active material of a lithium ion secondary battery can be used without particular limitation. Preferred examples include carbon materials of which at least a part has a graphite structure (layered structure) such as graphite, non-graphitizable carbon (hard carbon), easily graphitizable carbon (soft carbon), and carbon nanotubes. In order to obtain a high energy density, a graphite-based material such as natural graphite (graphite) or artificial graphite can be preferably used. In addition to the negative electrode active material, one, two or more materials that can be used as constituent components of the negative electrode mixture layer in a general lithium ion secondary battery can be included in the negative electrode mixture layer as necessary. Examples of such materials include a binder and various additives. As the binder, a polymer material such as SBR or PTFE can be suitably used. In addition, various additives such as a thickener and a dispersant can be appropriately used. For example, a cellulose-based polymer such as CMC can be suitably used as the thickener. When a composition (negative electrode mixture paste) prepared as a paste or slurry by dispersing the negative electrode active material and the above materials used as necessary in an appropriate solvent (for example, an aqueous solvent such as distilled water) is applied to the negative electrode current collector, the solvent included in the paste being removed and dried, and pressed as necessary (that is, a negative electrode mixture paste applying process), a negative electrode sheet including the negative electrode mixture layer on the negative electrode current collector can be prepared (that is, a negative electrode preparing process).

Next, the electrode body preparing process (S30) will be described. In this process, the positive electrode 50 prepared in the above positive electrode preparing process (S20) and the negative electrode 60 prepared separately are laminated with the separator 70 therebetween and wound to prepare the wound electrode body 20 (refer to FIG. 1). As the separator 70 interposed between the positive and negative electrode sheets 50 and 60, any material which insulates the positive electrode mixture layer 54 from the negative electrode mixture layer 64 and has a retention function and a shutdown function for a nonaqueous electrolytic solution may be used. Preferred examples include a porous resin sheet (film) made of a resin such as polyethylene (PE), polypropylene (PP), polyester, cellulose, and polyamide.

Next, the battery assembly constructing process (S40) will be described. In this process, the prepared wound electrode body 20 is accommodated in a rectangular battery case (not shown), and a positive electrode terminal and a negative electrode terminal for external connection provided in a part (typically, the lid) of the case are electrically connected to the positive electrode 50 (the positive electrode mixture layer not formed part 52a) and the negative electrode 60 (the negative electrode mixture layer not formed part 62a) of the wound electrode body 20. At the same time, a desired nonaqueous electrolytic solution is injected into the case. Then, when the battery case is sealed by a method such as welding, a battery assembly according to the present embodiment is constructed. The nonaqueous electrolytic solution used may be the same as that used in this type of battery in the related art and is not particularly limited. For example, preferred examples of a lithium salt (supporting salt) containing the element fluorine include $LiPF_6$ and $LiBF_4$. In addition, preferred examples of the nonaqueous solvent (that is, an organic solvent) include a cyclic carbonate solvent such as ethylene carbonate (EC) and propylene carbonate (PC), a chain carbonate solvent such as dimethyl carbonate (DMC) and ethyl methyl carbonate (EMC), and an ester solvent such as ethyl propionate (EP). When a lithium salt with a concentration of about 0.1 mol/L to 5 mol/L is contained in this nonaqueous solvent, it is possible to prepare a nonaqueous electrolytic solution for a lithium ion secondary battery. In the nonaqueous electrolytic solution, various additives for realizing various purposes, for example, additives such as a gas generating agent, a film forming agent, a dispersant, and a thickener, may be added to the nonaqueous electrolytic solution. For example, a fluorophosphates such as lithium difluorophosphate ($LiPO_2F_2$), an oxalate complex such as lithium bisoxalate borate (LiBOB), vinylene carbonate, and the like are suitable additives that contribute to improving performance of the battery. In addition, an overcharging inhibitor such as cyclohexylbenzene and biphenyl may be used.

Next, the initial charging process (S50) is performed on the battery assembly in which a case to which the nonaqueous electrolytic solution is supplied and the electrode body is accommodated therein is sealed. Similarly to the lithium ion secondary battery of the related art, an external power supply is connected between a positive electrode terminal and a negative electrode terminal for external connection, and the battery assembly is initially charged at a normal temperature (typically, about 25° C.) until a voltage between positive and negative electrode terminals becomes a predetermined voltage. For example, as initial charging, constant current and constant voltage charging (CC-CV charging) in which charging is performed at a constant current of about 0.1C to 10C until a voltage between terminals reaches a predetermined voltage (for example, 4.3 V to 4.8 V) from charging starts, and charging is then performed at a constant voltage until a state of charge (SOC) becomes about 60% to 100% can be performed. Alternatively, charging may be performed at a charging rate (current value) of ⅓C or less (typically, ½₀C to ⅓C) until at least the SOC reaches 20% from when charging starts, charging may be then performed at a constant current of about 0.1C to 10C until a voltage between terminals reaches a predetermined voltage, and additionally charging may be performed at a constant voltage until the SOC becomes about 60% to 100%. In addition, after the initial charging process (S50) ends, as an additional conditioning treatment, a discharging treatment may be performed at a current value that is substantially the same as a charging rate during the constant current charging, and then, a charging and discharging cycle may be performed several times at a rate that is substantially the same as the current value. Alternatively, a charging and discharging cycle may be performed several times at a rate that is different from the charging and discharging rate of the charging and discharging cycle.

Then, when an aging treatment is performed, it is possible to provide the lithium ion secondary battery 100 that can exhibit favorable performance. The aging treatment is performed by high temperature aging in which the initially charged battery 100 is left in a high temperature range of 35° C. or higher for 6 hours or longer (preferably, 10 hours or longer, for example, 20 hours or longer). Thereby, it is possible to increase a stability of a solid electrolyte interphase (SEI) coating film formed on the surface of the negative electrode during initial charging and reduce the internal resistance. In addition, it is possible to improve the durability of the lithium ion secondary battery in response to high temperature storage. The aging temperature is preferably about 35° C. to 85° C. (more preferably 40° C. to 80° C., and most preferably 50° C. to 70° C.). When the aging temperature is lower than this range, an effect of reducing the initial internal resistance may be insufficient. When the aging temperature is higher than this range, the nonaqueous solvent or the lithium salt may decompose, the electrolytic solution may deteriorate, and the internal resistance may increase. The upper limit of an aging time is not particularly limited. However, when the upper limit exceeds about 50 hours, the initial internal resistance is significantly gradually reduced, and the resistance value is unlikely to be changed. Therefore, in consideration of cost reduction, the aging time is preferably about 6 hours to 50 hours (more preferably 10 hours to 40 hours, for example, 20 hours to 30 hours).

Test examples related to the present disclosure will be described below. However, this is not intended to limit the present disclosure to such specific examples.

TEST EXAMPLE 1

$Li_5FeO_4$ powder was prepared. Here, $Li_5FeO_4$ was synthesized when $Li_2O$ and $\alpha$-$Fe_2O_3$ were mixed at a suitable stoichiometric ratio to prepare a mixed powder material and heated at a high temperature (for example, 800° C. to 900° C.) for a predetermined time (for example, 30 minutes to 60 minutes) and reacted. On the other hand, as a positive electrode active material, $LiNi_{0.5}Mn_{1.5}O_4$, which is a 5 V-class spinel structure lithium nickel manganese composite oxide, was prepared. In addition to the positive electrode active material, acetylene black (AB) as a conductive additive, polyacrylic acid (PAA: highly crosslinked water-absorbent resin particles) as a binding agent (binder), and lithium phosphate (LPO) as an additive were prepared at a mass ratio of $LiNi_{0.5}Mn_{1.5}O_4$:AB:PAA:LPO=90:5:2.2:2.8.

In addition, the prepared $Li_5FeO_4$ powder was added at an addition amount of 0.2 wt % (0.2 parts by mass), 0.3 wt % (0.3 parts by mass), 0.6 wt % (0.6 parts by mass), 0.8 wt % (0.8 parts by mass), 1.5 wt % (1.5 parts by mass), 2.0 wt % (2.0 parts by mass), and 2.2 wt % (2.2 parts by mass) with respect to the total solid content 100 wt % (100 parts by mass) of the paste and a total of 7 types of aqueous positive electrode mixture paste containing $Li_5FeO_4$ powder with different compositional proportions were prepared. Specifically, the materials were mixed in and stirred according to the flow shown in FIG. 4, an appropriate amount of deionized water was mixed in so that a solid fraction (NV) was 70 wt % or more, and thereby an aqueous positive electrode mixture paste was prepared. That is, first, $LiNi_{0.5}Mn_{1.5}O_4$, acetylene black (AB), and $Li_5FeO_4$ were mixed and stirred for about 5 minutes. Deionized water into which an appropriate amount of a thickener (CMC) was mixed in advance was added to the mixed and stirred material so that the final solid fraction (NV) was 70% or more, and a dispersion treatment was performed using a stirring rod such as a commercially available planetary dispersion mixer at 4000 rpm for 30 minutes. Next, a polyacrylic acid was added, the mixture was manually stirred using a stirring rod for about 5 minutes, and a total of 7 types of aqueous positive electrode mixture paste containing $Li_5FeO_4$ powder with different compositional proportions were prepared. Here, in the paste preparation process, a small amount of phosphoric acid was appropriately added, and a pH of the paste remained in a neutral range (7 to 11).

Then, all of the prepared positive electrode mixture pastes were applied to a surface of an aluminum foil (positive electrode current collector), a positive electrode mixture layer of which a density was adjusted to have a predetermined value by roll press processing was formed, this was dried in an atmosphere at 140° C. for 30 seconds, and a total of 7 types of positive electrode sheet corresponding to the prepared positive electrode mixture pastes were prepared.

On the other hand, a natural graphite-based carbon material (C) as a negative electrode active material, SBR as a binder, and CMC as a thickener were weighed out at a mass ratio of C:SBR:CMC=98:1:1, and an appropriate amount of deionized water was mixed in so that a solid fraction (NV) was 70 wt %, and thereby an aqueous negative electrode mixture paste was prepared. Then, the prepared negative electrode mixture paste was applied to a surface of a copper foil (negative electrode current collector), a negative electrode mixture layer of which a density was adjusted to have a predetermined value by roll press processing was formed, this was dried in an atmosphere at 140° C. for 30 seconds, and thereby a negative electrode sheet according to the present test example was prepared. In addition, $LiPF_6$ as a lithium salt was dissolved at a concentration of 1 mol/L in a mixed solvent containing monofluoroethylene carbonate (FEC) as a cyclic carbonate and methyl-2,2,2-trifluoroethyl carbonate (MTFEC) as a chain carbonate (volume ratio of 50:50) and this was stirred and mixed to prepare a nonaqueous electrolytic solution.

All of the prepared positive electrode sheets, and the negative electrode sheet were laminated with a separator therebetween and wound to prepare a wound electrode body. As the separator, a porous film having a three-layer structure of polyethylene (PE)/polypropylene (PP)/polyethylene (PE) was used. Next, the electrode body and the nonaqueous electrolytic solution were accommodated in a laminated battery case and then sealed to construct a total of 7 types of lithium ion secondary battery assembly according to the present test example. Then, the constructed test lithium ion secondary battery assemblies were charged and discharged under a temperature environment of 25° C. at a rate of 0.3C between 0 V and 4.75 V, and an initial charging process was performed. After the initial charging process, the test batteries in a state of an SOC of 100% were accommodated in a thermostatic chamber at 60° C., and were subjected to high temperature aging for 20 hours.

After the high temperature aging was completed, the test batteries were returned to a temperature environment of 25° C., an SOC was adjusted to 40%, and then an AC impedance was measured. A diameter of a semicircle was read from a Nyquist plot of the obtained impedance and set as a reaction resistance ($\Omega$). Here, as measurement conditions for the AC impedance, an applied AC voltage was 5 mV and a frequency range was 0.001 Hz to 100,000 Hz. Then, a reaction resistance value of a battery constructed using an aqueous positive electrode mixture paste containing $Li_5FeO_4$ that was added in an amount of 0.2 wt % (0.2 parts by mass) was set as a reference value (1), and a relative value (relative ratio) with respect to this reference value of the reaction resistance values obtained in the batteries constructed using an aqueous positive electrode mixture paste containing $Li_5FeO_4$ in a predetermined proportion was calculated as a reaction resistance ratio. The results are shown in Table 1.

TABLE 1

| Amount of $Li_5FeO_4$ added (wt %) | Reaction resistance ratio |
|---|---|
| 0.2 | 1 |
| 0.3 | 0.99 |
| 0.6 | 0.94 |
| 0.8 | 0.92 |
| 1.5 | 0.96 |
| 2.0 | 0.99 |
| 2.2 | 1.05 |

As shown in Table 1, it was found that, when $Li_5FeO_4$ was added, the internal resistance (reaction resistance) of the battery was reduced. The result indicates that, when $Li_5FeO_4$ was added to the aqueous positive electrode mixture paste, oxygen derived from $Li_5FeO_4$ in the initial charging process after the battery assembly was constructed was supplied to the positive electrode active material, and as a result, an effect of restoring $Mn^{3+}$ that could be formed during the drying treatment when the paste was prepared and during the subsequent high temperature aging treatment to $Mn^{4+}$ was exhibited. Accordingly, in an initial conditioning treatment step, oxygen (in an ionic form) derived from $Li_5FeO_4$ was supplied to the manganese-containing positive electrode active material, an amount of $Mn^{3+}$ could be reduced and regeneration of $Mn^{4+}$ could be promoted. In the present test example, it was found that, in particular, with respect to the total solid content (100 wt %) in the paste (in other words, the positive electrode mixture layer on the positive electrode sheet), an amount of $Li_5FeO_4$ added was preferably 0.3 to 2.0 wt %, and particularly preferably 0.6 wt % to 1.5 wt %.

TEST EXAMPLE 2

Next, a difference in the status of the presence of oxygen (O) contained in the positive electrode mixture layer between a lithium ion secondary battery constructed using an aqueous positive electrode mixture paste in which an amount of $Li_5FeO_4$ added was 0.8 wt % using Test Example 1 and a lithium ion secondary battery constructed using the same materials and under the same conditions as in Test Example 1 except that an aqueous positive electrode mixture paste containing no $Li_5FeO_4$ was used as a subject for comparison with the above test example was evaluated using a scanning transmission electron microscopy-electron energy loss spectroscopy (STEM-EELS method). The details are as follows.

First, the battery for evaluation in the step after the initial charging process was recovered and disassembled, and the positive electrode mixture layer on the positive electrode sheet was washed with a nonaqueous solvent (here, ethylene carbonate) containing no lithium salt. Next, a cross section of the positive electrode mixture layer was processed by Ar ion milling (CP), and the CP processed sectional image (STEM image) was observed using STEM. EELS was performed on an appropriate part determined by observing the sectional image based on the user manual of the electron energy loss spectrometer used in the present test. Then, an EELS spectrum was obtained by performing line analysis (surface analysis was also possible) from the surface of the positive electrode active material particles into the particles. Then, the first rising position (Mn maximum peak position) of a Mn (more preferably, Ni) peak in the surface part of the active material particles from the EELS spectrum obtained by line analysis was determined, and an O peak ratio (A/B) between a peak intensity (peak height: A) of O at the Mn maximum peak position and a peak intensity (peak height: B) of O at a position indicating the maximum peak intensity of O (O maximum peak position) in the spectrum was obtained. The results as an average of the O peak ratios obtained from the EELS spectrums obtained after a plurality of line analyses were performed are shown in Table 2.

TABLE 2

| $Li_5FeO_4$ | Added | Not added |
|---|---|---|
| O peak ratio | 0.91 | 0.66 |

The "O peak ratio (A/B) based on the STEM-EELS method" defined as above may be an index of an oxygen supply status in the positive electrode mixture layer of the lithium ion secondary battery in the step after the initial charging process. Thus, the above test example showed that a sufficient amount of oxygen was supplied to the positive electrode active material ($LiNi_{0.5}Mn_{1.5}O_4$) present in the positive electrode mixture layer after the initial charging process in the lithium ion secondary battery constructed using the aqueous positive electrode mixture paste containing $Li_5FeO_4$. Accordingly, based on the results of the present test example, in the lithium ion secondary battery disclosed here, it was confirmed that, for example, $Mn^{3+}$ could be easily returned to $Mn^{4+}$ after the initial charging process.

What is claimed is:

1. A method of producing a lithium ion secondary battery comprising;
   preparing an aqueous positive electrode mixture paste that includes a positive electrode active material containing a lithium manganese composite oxide, an aqueous solvent, and $Li_5FeO_4$ as an additive,
   wherein an amount of $Li_5FeO_4$ added is within a range of 0.3 wt % to 2.0 wt % with respect to a total solid content of 100 wt % in the positive electrode mixture paste;
   fabricating a positive electrode by forming a positive electrode mixture layer on a positive electrode current collector using the aqueous positive electrode mixture paste;
   fabricating an electrode body using the positive electrode and a negative electrode, wherein the negative electrode includes a negative electrode mixture layer on a negative electrode current collector, the negative electrode mixture layer includes a negative electrode active material;
   constructing a battery assembly by accommodating the electrode body and a nonaqueous electrolytic solution including a lithium salt in a battery case; and
   performing an initial charging process on the battery assembly.

2. The method according to claim 1, wherein the lithium manganese composite oxide includes at least one of $LiNi_{0.5}Mn_{1.5}O_4$, $LiMn_2O_4$, $LiNi_xMe_yMn_{2-x-y}O_4$, $Li_2MnO_3$, and $LiMnPO_4$, x in $LiNi_xMn_{2-x}O_4$ satisfies $0<x<2$, Me in $LiNi_xMe_yMn_{2-x-y}O_4$ is at least one element selected from the group including Fe, Ti, Al, Si, Mg, Ca, Ba, Sr, Sc, V, Cr, Co, Cu, Zn, Ga, Y, Ru, Rh, Pd, In, Sn, Sb, La, Ce, Sm, Zr, Nb, Ta, Mo, and W, and x and y in $LiNi_xMe_yMn_{2-x-y}O_4$ satisfy $0<(x+y)<2$.

3. The method according to claim 1, wherein the lithium manganese composite oxide includes $LiNi_{0.5}Mn_{1.5}O_4$.

4. The method according to claim 1 further comprising
   after the battery assembly is initially charged, performing an aging treatment in which the battery assembly is left at a temperature of 35° C. or higher, for a duration greater than or equal to 6 hours and less than or equal to 50 hours.

5. The method according to claim 1, wherein the amount of $Li_5FeO_4$ added is within a range of 0.6 wt % to 1.5 wt % with respect to a total solid content of 100 wt % in the positive electrode mixture paste.

* * * * *